US011074514B2

United States Patent
Caffrey (10) Patent No.: US 11,074,514 B2
(45) Date of Patent: Jul. 27, 2021

(54) CONFIDENCE INTERVALS FOR ANOMALIES IN COMPUTER LOG DATA

(71) Applicant: International Business Machines Corporation, Armonk, NY (US)

(72) Inventor: James M. Caffrey, Woodstock, NY (US)

(73) Assignee: International Business Machines Corporation, Armonk, NY (US)

(*) Notice: Subject to any disclaimer, the term of this patent is extended or adjusted under 35 U.S.C. 154(b) by 1208 days.

(21) Appl. No.: 15/239,916

(22) Filed: Aug. 18, 2016

(65) Prior Publication Data

US 2018/0053106 A1    Feb. 22, 2018

(51) Int. Cl.
  G06N 7/00       (2006.01)
  G06N 20/00      (2019.01)
  G06N 5/04       (2006.01)
  G06F 11/07      (2006.01)

(52) U.S. Cl.
  CPC ......... *G06N 7/005* (2013.01); *G06F 11/0751* (2013.01); *G06N 5/048* (2013.01); *G06N 20/00* (2019.01); *G06N 5/045* (2013.01)

(58) Field of Classification Search
  CPC .......... G06N 5/04; G06N 5/02; G06N 99/005; G06N 20/00; G06N 20/10; G06N 20/20; G09B 7/04; G06F 9/4446
  USPC ......................................................... 706/11
  See application file for complete search history.

(56) References Cited

U.S. PATENT DOCUMENTS

| 8,527,435 | B1* | 9/2013 | Han ..................... G06N 20/10 706/12 |
| 8,914,317 | B2 | 12/2014 | Biem |
| 9,516,053 | B1* | 12/2016 | Muddu .................... G06N 5/04 |
| 9,785,495 | B1* | 10/2017 | Lazier ................ G06F 11/0709 |
| 2007/0136115 | A1 | 6/2007 | Senturk Doganaksoy et al. |
| 2009/0030752 | A1 | 1/2009 | Senturk-Doganaksoy |
| 2010/0063948 | A1* | 3/2010 | Virkar ..................... G06N 3/02 706/12 |
| 2013/0117852 | A1* | 5/2013 | Stute ................... H04L 63/1425 726/23 |
| 2014/0289172 | A1* | 9/2014 | Rothman ................ A61B 5/16 706/11 |
| 2015/0341379 | A1* | 11/2015 | Lefebvre ............... H04W 12/08 726/22 |

(Continued)

OTHER PUBLICATIONS

Airola et al—"An experimental comparison of cross-validation techniques for estimating the area under the ROC curve"—2010—https://www.sciencedirect.com/science/article/pii/S0167947310004469?via%3Dihub (Year: 2010).*

(Continued)

*Primary Examiner* — Viker A Lamardo
(74) *Attorney, Agent, or Firm* — Stosch Sabo (57) ABSTRACT

Anomaly scores for respective message types in computer log data and confidence intervals for respective anomaly scores are calculated based on a number of appearances of respective message types in a plurality of models generated from a historical set of computer log data. Respective models of the plurality of models can have at least a portion of the historical set of computer log data excluded from the respective models. Respective anomaly scores and respective confidence intervals can be applied to a new set of log data to identify and troubleshoot unusual log data events.

12 Claims, 6 Drawing Sheets

(56) References Cited

U.S. PATENT DOCUMENTS

| | | | |
|---|---|---|---|
| 2016/0065604 A1* | 3/2016 | Chen | G06Q 30/0185 726/23 |
| 2016/0142435 A1 | 5/2016 | Bernstein et al. | |
| 2016/0217022 A1* | 7/2016 | Velipasaoglu | G06F 11/0772 |
| 2017/0063890 A1 | 3/2017 | Muddu et al. | |
| 2017/0063910 A1* | 3/2017 | Muddu | H04L 63/1425 |
| 2018/0053109 A1 | 2/2018 | Caffrey | |

OTHER PUBLICATIONS

Lucila Ohno-Machado—"Cross-validation and Bootstrap Ensembles, Bagging, Boosting"—2011—https://web.archive.org/web/20110403135855/https://ocw.mit.edu/courses/health-sciences-and-technology/hst-951j-medical-decision-support-fall-2005/lecture-notes/hst951_6.pdf (Year: 2011).*

Lendasse et al.—"Model Selection with Cross-Validations and Bootstraps—Application to Time Series Prediction with RBFN Models"—2003—https://www.semanticscholar.org/paper/Model-Selection-with-Cross-Validations-and-to-Time-Lendasse-Wertz/00ce521469693a2bc03e0a45a3e2a3e2467404db (Year: 2003).*

Mogensen et al.—"Evaluating Random Forests for Survival Analysis using Prediction Error Curves"—2012—https://www.ncbi.nlm.nih.gov/pmc/articles/PMC4194196/ (Year: 2012).*

List of IBM Patents or Patent Applications Treated as Related, Aug. 2, 2017. 2 pages.

Caffrey, "Confidence Intervals for Anomalies in Computer Log Data", U.S. Appl. No. 15/668,030, filed Aug. 3, 2017.

Accelerated Examination Support Document, U.S. Appl. No. 15/668,030, filed Mar. 9, 2017, 22 pgs.

Deedwaniya, Anuja, "IT Analytics for system 2 Nordics Large System Update 2014", IBM Corp . . . Oct. 2014 51 pages. <www-03.ibm.com/systems/data/flash/ok/resources/LSU/LSU_2014_IT_Analytics.pdf>.

Bengtsson, Uno, "Smart Monitoring of z/OS with IBM zAware", IBM Large Systems Update 2012, Nov. 2012, 63 pages, see 3b ftp://redbooks.ibm.com/redbooks/2012_ITSO_Large_Systems_Update_Nordics/track_01_zEnterprise_and_Storage_Technical_Update/LSU_2012_zEnterprise_EC12_zAware%20.pdf.

Kumar et al., "Bootstrap prediction intervals in non-parametric regression with applications to anomaly detection", NASA Research Paper, 2012. 9 pages.

Wood, "Statisitical inference using bootstrap confidence intervals", Dec. 2004. Significance, pp. 180-182.

* cited by examiner

CONFIDENCE INTERVALS FOR ANOMALIES IN COMPUTER LOG DATA

BACKGROUND

The present disclosure relates to identifying anomalies in log data, and, more specifically, to estimating accuracies of anomaly scores using confidence intervals.

Log data can comprise messages generated by one or more operating systems. Log data messages can include, but are not limited to, console messages and application messages stored in, for example, operations log (OPERLOG) or system log (syslog) catalogues. Log data can be analyzed for anomalies. Log data anomalies can include rare messages that may indicate abnormal system behavior.

SUMMARY

Aspects of the present disclosure are directed to a method for generating anomaly scores and confidence intervals for message types in computer log data. The method can comprise receiving a plurality of periods of log data comprising various message types. Respective periods of log data can be made up of a plurality of subsets such that each subset comprises log data from a respective time interval of a respective period. The method can further comprise generating a plurality of models using the plurality of periods of log data, where respective models comprise the plurality of periods of log data having at least one respective period of log data excluded. The method can further comprise calculating, for respective models, respective anomaly scores for at least a first message type indicating a rarity of the first message type in respective models. The method can further comprise determining a first average anomaly score for the first message type by dividing a sum of the respective anomaly scores by the plurality of models. The method can further comprise calculating a confidence interval for the first average anomaly score of the first message type based on the first average anomaly score, a statistic based on respective anomaly scores of the first message type, the plurality of models, and a confidence parameter. The method can further comprise storing, for respective various message types, respective average anomaly scores and respective confidence intervals for respective average anomaly scores in a non-transitory computer readable storage medium.

Further aspects of the present disclosure are directed to a system having a plurality of compute nodes communicatively coupled to one another via a network. The system can include a user interface configured to present output to a user, a memory configured to store log data comprising respective message types generated by the plurality of compute nodes, a database configured to store respective message types, respective anomaly scores for respective message types, and respective confidence intervals for respective anomaly scores, where respective anomaly scores and respective confidence intervals are generated according to a plurality of models generated by a plurality of periods of historical log data retrieved from a population of historical log data, and a processor communicatively coupled to the user interface, the memory, and the database. The processor can be configured to retrieve a first interval of log data from the memory comprising a plurality of new messages generated during a first time interval. The processor can be further configured to match respective message types of the plurality of new messages to respective message types stored in the database. The processor can be further configured to apply, to respective matched message types in the plurality of new messages, respective anomaly scores and respective confidence intervals for the respective anomaly scores from the database. The processor can be further configured to output respective anomaly scores and respective confidence intervals for respective anomaly scores for respective messages in the plurality of new messages.

Further aspects of the present disclosure are directed to a computer program product comprising a computer readable storage medium having program instructions embodied therewith, where the computer readable storage medium is not a transitory signal per se. The program instructions are executable by a processor to cause the processor to perform a method comprising calculating at least a first plurality of respective anomaly scores from a plurality of respective models in a training set for at least a first respective message type, where respective anomaly scores for respective message types are based on a number of appearances of respective message types in respective models. The program instructions can cause the processor to perform a method further comprising generating at least a first confidence interval for the first plurality of respective anomaly scores comprising a range of values centered on a first average anomaly score for the first plurality of respective anomaly scores, where the first confidence interval indicates a range of a true anomaly score for the first respective message type according to a first probability. In response to receiving a new interval of log data containing a first appearance of the first respective message type, the program instructions can cause the processor to perform a method further comprising applying the first average anomaly score and the first confidence interval to the first appearance of the first respective message type and outputting the first respective message type, the first average anomaly score, and the first confidence interval.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

According to some embodiments of the present disclosure, anomaly scores and confidence intervals of anomaly scores are generated for log data message types. In some embodiments, interval scores and confidence intervals for interval scores are generated for intervals of log data messages. In some embodiments, anomaly scores, confidence intervals of anomaly scores, interval scores, and/or confidence intervals for interval scores are presented to a user interface to assist in identifying and troubleshooting unusual log data events.

Anomaly scores are calculated using a model created during training. Training uses historical log data to determine anomaly scores of real-time log data. Historical log data can comprise a plurality of periods (e.g., a period can be a day of log data) and intervals within respective periods (e.g., an interval can comprise 10 minutes of log data within a period of log data). The historical log data can be used to generate a plurality of models. The plurality of models can be generated by removing at least one period from the historical log data.

Anomaly scores for respective message types can be calculated from the plurality of models. Anomaly scores can indicate a rarity of a respective message type in the model. Statistics such as, but not limited to, mean, variance, and standard deviation can be computed using the plurality of anomaly scores generated by the plurality of models. The statistics can be used to generate confidence intervals for respective anomaly scores.

Interval scores can be calculated by combining anomaly scores in respective intervals of respective models. In some embodiments, anomaly scores are combined by summing anomaly scores. Intervals (also described as subsets and sub-periods herein) are sets of log data compiled for a defined amount of time. Statistics such as, but not limited to, mean, variance, and standard deviation can be computed for the plurality of interval scores generated by the plurality of models. The statistics can be used to generate confidence intervals for one or more respective interval scores.

As is understood by one of skill in the art, a confidence interval represents a range of values of a statistic generated from a sample of data such that a statistic generated from a population of the data will fall within the range of values according to a selected probability. Confidence intervals can be calculated using a distribution such as, but not limited to, a Student's t distribution.

Advantageously, aspects of the present disclosure provide an estimation of accuracy for anomaly scores and interval scores using a limited training dataset. Estimated accuracies are provided by confidence intervals for respective message types appearing in the log data and respective intervals of log data. Confidence intervals provide additional information to respective anomaly scores and respective interval scores regarding anomalous log data behavior.

Furthermore, the confidence intervals are generated from multiple models generated by a single log data training set. Thus, aspects of the present disclosure can use a limited amount of data to generate reasonable statistics regarding the population of data from which the training set is retrieved. It is to be understood that the aforementioned advantages are example advantages and not all advantages are described. Furthermore, embodiments of the present disclosure can contain all, some, or none of the aforementioned advantages while remaining within the spirit and scope of the present disclosure.

Figure 1:
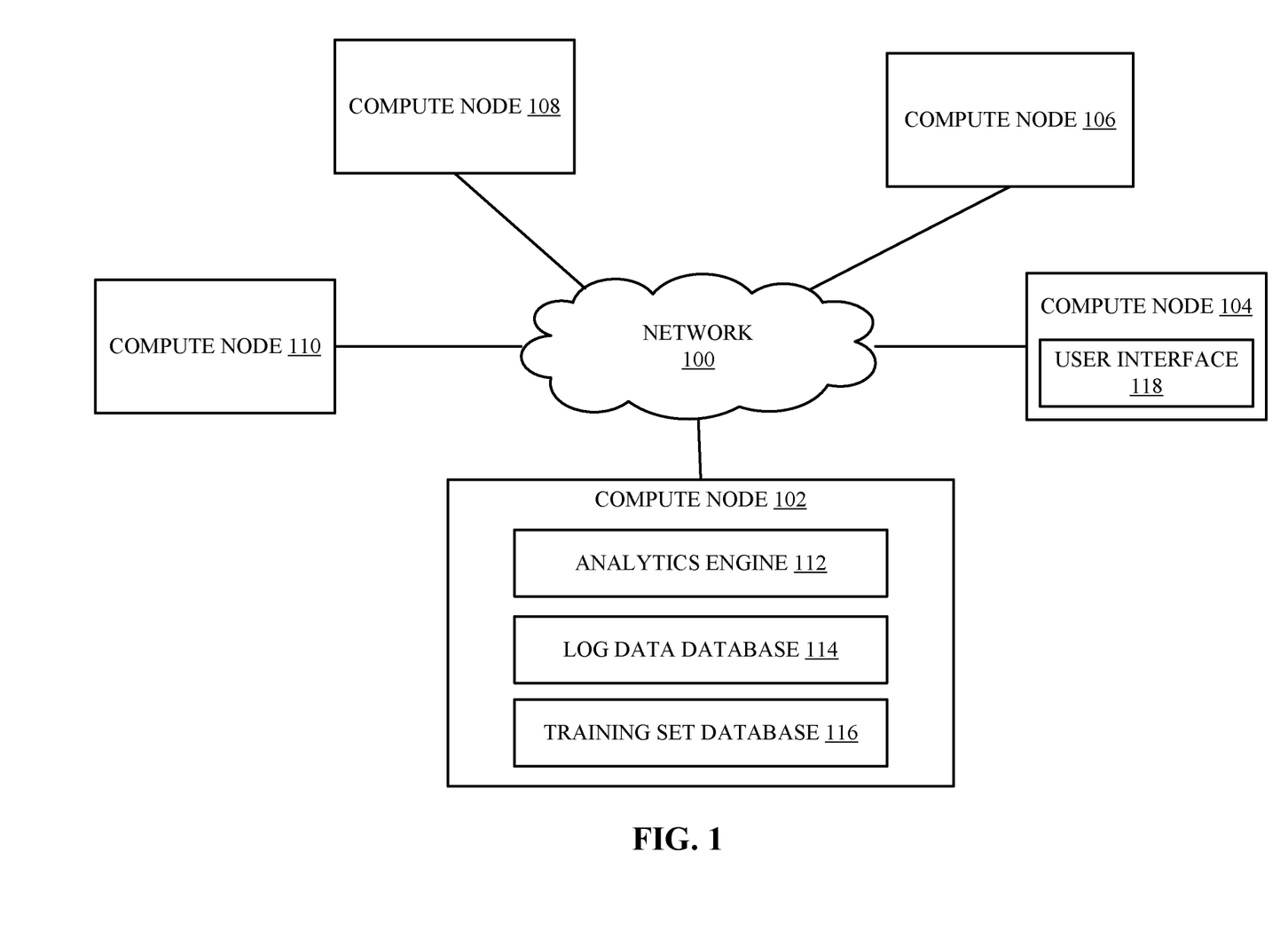
FIG. 1 illustrates a block diagram of a network in which some embodiments of the present disclosure can be implemented.

Referring now to the figures, FIG. 1 illustrates a block diagram of a network in which some embodiments of the present disclosure can be implemented. The network 100 can comprise a physical or virtual network configured to communicatively couple a plurality of devices to one another. The network 100 can facilitate communication between one or more compute nodes such as compute nodes 102, 104, 106, 108, and 110. Respective compute nodes can comprise servers, workstations, laptops, user devices, mobile devices, and/or other devices. Compute node 102 can comprise an analytics engine 112, a log data database 114, and a training set database 116.

Training set database 116 can comprise historical log data from one or more compute nodes. The log data can be retrieved from, for example, an operations log (OPERLOG) and/or syslog catalogue from the one or more compute nodes. The training set database 116 can comprise log data separated into periods (e.g., a period can be a day) and intervals within each period (e.g., 10-minute intervals). In some embodiments, the training set database 116 can comprise at least 90 days of log data.

Analytics engine 112 can use training set database 116 to calculate anomaly scores and confidence intervals for respective message types. Analytics engine 112 can store respective anomaly scores and confidence intervals for respective message types in training set database 116. Analytics engine 112 can further use training set database 116 and the calculated anomaly scores of the respective message types to calculate one or more reference interval scores and one or more reference confidence intervals for respective reference interval scores.

One of skill in the art will appreciate that the intervals can comprise various amounts of time. Furthermore, various types of intervals can be generated. For example, a first set of intervals can contain 144 sequential 10-minute intervals of log data generated for a day of log data. A second set of intervals can contain three sequential 8-hour intervals of log data generated for the day of log data. Thus, a plurality of sets of intervals can be established, and various sets of intervals can comprise various durations of log data.

Log data database 114 can accumulate log data from one or more compute nodes in real time. Log data database 114 can, for example, retrieve log data from one or more operations logs (OPERLOGS) and/or one or more syslog catalogues on one or more compute nodes. Once an interval of log data has been collected in log data database 114, analytics engine 112 can retrieve the interval of log data from log data database 114 and can analyze the interval of log data. In some embodiments, log data can be sent to analytics engine 112 as it is received in log data database 114.

Analytics engine 112 can match respective messages in the received interval of log data with respective messages in training set database 116 by matching a respective message type in the received interval of log data with a respective message type in training set database 116. For each matched message, analytics engine 112 can calculate the anomaly score and confidence interval using information associated with each matched message from training set database 116. Analytics engine 112 can combine respective anomaly scores to generate an interval score for the received interval. Analytics engine 112 can calculate a reference interval score and a respective confidence interval using information associated with the reference interval score from training set database 116. Analytics engine 112 can output the anomaly scores, anomaly score confidence intervals, interval score, reference interval score, and/or reference interval score confidence interval to a user interface 118.

Although user interface 118 is shown as located on a different compute node from the analytics engine 112, the user interface 118 can also be located on the same compute node as analytics engine 112. Likewise, log data database 114 can be located on a same compute node or a different compute node as analytics engine 112. Likewise, training set database 116 can be located on a same compute node or a different compute node as analytics engine 112. In various embodiments, analytics engine 112 evaluates log data generated by a single compute node, a portion of the plurality of compute nodes, or the plurality of compute nodes in the network 100.

Figure 2:
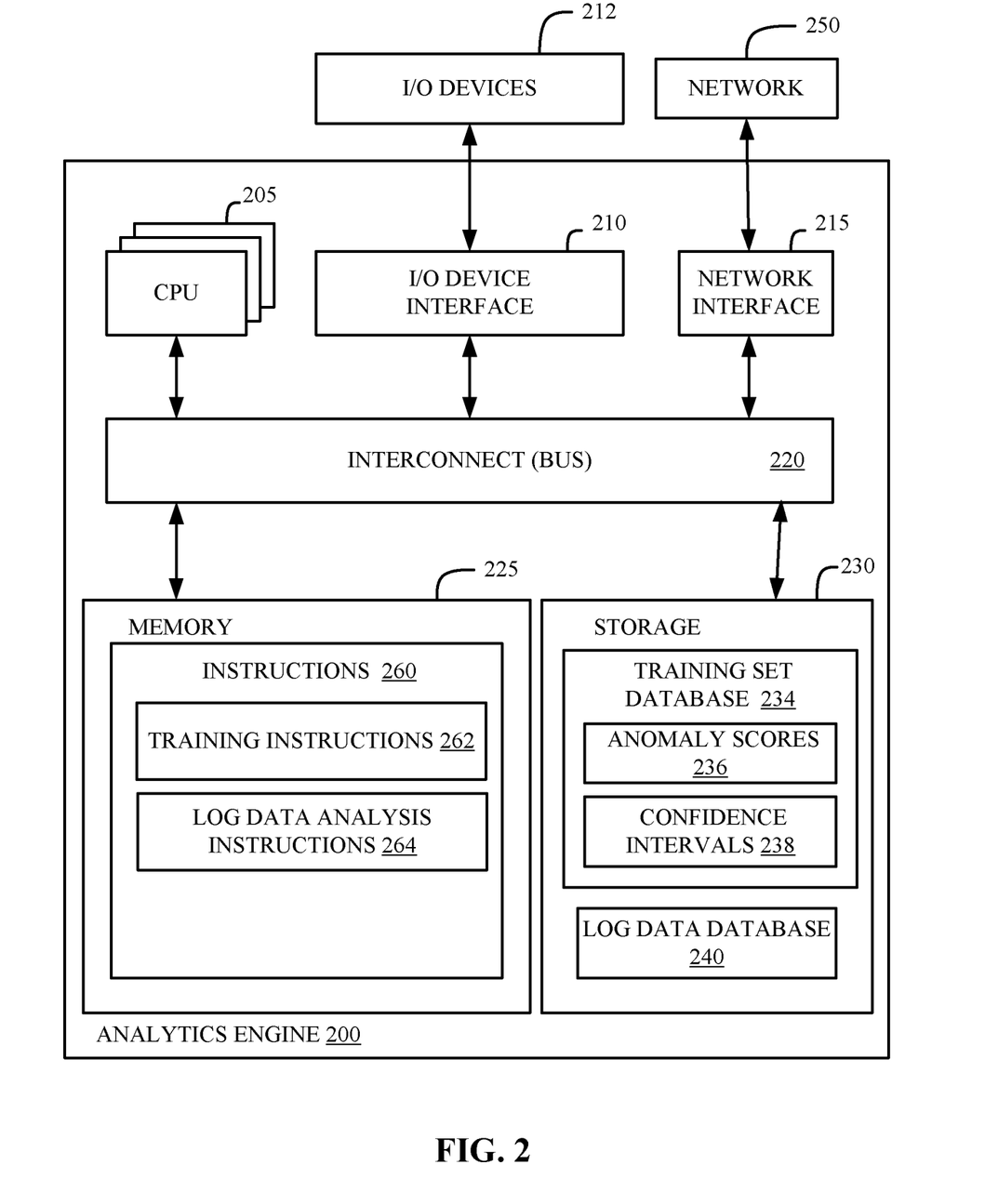
FIG. 2 illustrates a block diagram of an analytics engine capable of executing some embodiments of the present disclosure.

Referring now to FIG. 2, illustrated is a block diagram of an analytics engine in accordance with some embodiments of the present disclosure. In some embodiments, the analytics engine 200 can be consistent with analytics engine 112 of FIG. 1. The analytics engine 200 can include a memory 225, storage 230, an interconnect (e.g., BUS) 220, one or more processors 205 (also referred to as CPUs 205 herein), an I/O device interface 210, I/O devices 212, and a network interface 215.

Each CPU 205 retrieves and executes programming instructions stored in the memory 225 or storage 230. The interconnect 220 is used to move data, such as programming instructions, between the CPUs 205, I/O device interface 210, storage 230, network interface 215, and memory 225. The interconnect 220 can be implemented using one or more busses. The CPUs 205 can be a single CPU, multiple CPUs, or a single CPU having multiple processing cores in various embodiments. In some embodiments, a processor 205 can be a digital signal processor (DSP). Memory 225 is generally included to be representative of a random access memory (e.g., static random access memory (SRAM), dynamic random access memory (DRAM), or Flash). The storage 230 is generally included to be representative of a non-volatile memory, such as a hard disk drive, solid state device (SSD), removable memory cards, optical storage, or flash memory devices. In an alternative embodiment, the storage 230 can be replaced by storage area-network (SAN) devices, the cloud, or other devices connected to the analytics engine 200 via the I/O devices 212 or a communication network 250 via the network interface 215.

In some embodiments, the memory 225 stores instructions 260 and the storage 230 stores training set database 234 and log data database 240. However, in various embodiments, the instructions 260, the training set database 234, and the log data database 240 are stored partially in memory 225 and partially in storage 230, or they are stored entirely in memory 225 or entirely in storage 230, or they are accessed over a network 250 via the network interface 215.

Storage 230 contains training set database 234 and log data database 240. In some embodiments, the training set database 234 is consistent with training set database 116 of FIG. 1. Training set database 234 stores a plurality of periods of log data. The plurality of periods of log data are analyzed by analytics engine 200 according to training instructions 262. As a result of training, anomaly scores 236 and confidence intervals 238 are generated for respective message types. In some embodiments, one or more reference interval scores and one or more reference confidence intervals are generated as a result of training.

Storage 230 further contains log data database 240. In some embodiments, log data database 240 is consistent with log data database 114 of FIG. 1. Log data database 240 can store log data retrieved from network 250 (e.g., from a plurality of compute nodes such as compute nodes 102, 104, 106, 108, and 110 of FIG. 1). Analytics engine 200 can execute log data analysis instructions 264 to analyze the data stored in log data database 240 at predetermined intervals. For example, when log data database 240 collects a 10-minute interval of log data, then analytics engine 200 can execute log data analysis instructions 264 to analyze the log data of the most recent 10-minute interval stored in log data database 240.

In some embodiments, data stored in log data database 240 is copied to training set database 234 at predetermined time intervals. For example, every three months the log data stored in log data database 240 can be copied to training set database 234 and analytics engine 200 can execute training instructions 262 to analyze the updated log data in training set database 234 to generate an updated set of anomaly scores 236 and confidence intervals 238. Thus, analytics engine 200 can be retrained to generate accurate anomaly scores and confidence intervals as message types and message type frequencies change over time as a result of software changes, hardware changes, and/or other changes.

The instructions 260 store processor executable instructions for various methods such as the methods shown and described hereinafter with respect to FIGS. 3-6. The instructions can include training instructions 262 and log data analysis instructions 264. Training instructions 262 store processor executable instructions for analyzing data in training set database 234 and generating respective anomaly scores 236 and confidence intervals 238 for respective log data message types. In some embodiments, training instructions 262 can further analyze training set database 234 and anomaly scores 236 to generate one or more reference interval scores and one or more reference confidence intervals for each reference interval score. Training instructions 262 are described in further detail hereinafter with respect to FIGS. 3-5.

Log data analysis instructions 264 store processor executable instructions for analyzing respective messages in a respective interval of log data stored in log data database 240. Log data analysis instructions 264 can analyze respective messages contained in a respective interval of log data database 240 and match the respective messages to respective messages stored in training set database 234. Log data analysis instructions 264 can retrieve respective anomaly scores 236 and confidence intervals 238 associated with respective matched message types contained in the respective interval of log data in log data database 240. Log data analysis instructions 264 can output respective anomaly scores and respective confidence intervals associated with the log data interval in the log data database 240 to an I/O device 212 such as a user interface.

In some embodiments, log data analysis instructions 264 are further configured to cause processor 205 to combine respective anomaly scores for a respective interval to determine an interval score for the respective interval. Log data analysis instructions 264 can retrieve a reference interval score for the respective interval and a confidence interval for the reference interval score. Log data analysis instructions 264 can output the interval score, the reference interval score for the respective interval, and the confidence interval for the reference interval score to I/O devices 212 such as a user interface. Log data analysis instructions 264 are described in greater detail hereinafter with respect to FIG. 6.

In various embodiments, the I/O devices 212 can include an interface capable of presenting information and receiving input. In some embodiments, I/O devices 212 are consistent with user interface 118 of FIG. 1. In various embodiments, I/O devices 212 can include, but are not limited to, one or more of a display unit, a monitor, a touch screen, audio speakers, a printer, a keyboard, a mouse, and so on.

In some embodiments, the network 250 is consistent with network 100 of FIG. 1. The network 250 can connect the analytics engine 200 with training set database 232, log data database 240, and/or additional instructions 260 in embodiments where training set database 232, log data database 240, and/or additional instructions 260 are not stored on analytics engine 200 or are stored partially on analytics engine 200 and partially in compute nodes connected to analytics engine 200 via the network 250.

Figure 3:
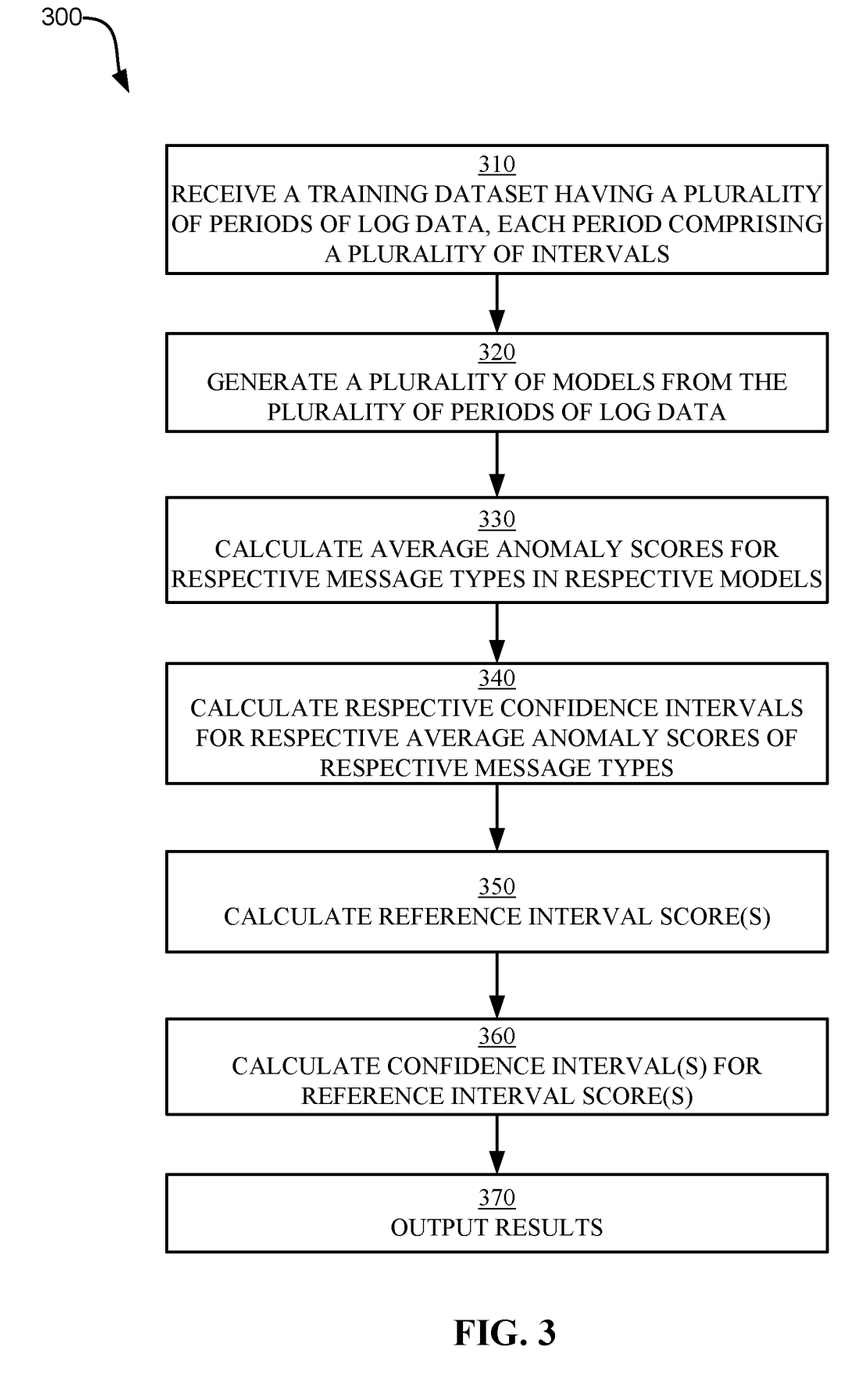
FIG. 3 illustrates a flowchart of an example method for training an analytics engine according to some embodiments of the present disclosure.

Referring now to FIG. 3, illustrated is a flowchart of an example method for training an analytics engine in accordance with some embodiments of the present disclosure. In some embodiments, the method 300 can be executed by one or more processors (e.g., processor 205 of FIG. 2) executing a set of instructions (e.g., instructions 260 of FIG. 2). In some embodiments, the method 300 can be executed by an analytics engine in a network (e.g., analytics engine 112 connected to network 100 as shown and described with respect to FIG. 1).

In operation 310, a training dataset having a plurality of periods of log data is received. In some embodiments, the training dataset is consistent with the training set database 116 of FIG. 1 and/or training set database 234 of FIG. 2. Each period comprises a plurality of intervals. For example, a first period can comprise a day of log data for at least one compute node. The first period can be segmented into, for example, 144 ten minute intervals of log data within the first period. As will be appreciated by one of skill in the art, any number of period durations and/or interval durations are possible.

Operation 320 generates a plurality of models based on the training dataset. Each model comprises at least a portion of the training dataset. In some embodiments, each model comprises the training dataset with one period of log data removed. For example, for a training dataset comprising N periods of log data (where N is a variable, positive integer), there can be N models generated such that each model comprises N−1 periods of log data. In some embodiments, each respective model removes a unique period of log data from the training set such that each respective period of the N periods appears in N−1 models and further such that the plurality of periods is equal to the plurality of models.

In some alternative embodiments, each model comprises the training dataset with more than one period of log data removed. For example, for a training dataset comprising N periods of log data (where N is a variable, positive integer), there can be Y models generated such that Y is greater than or equal to N. Each model can comprise N−x periods of log data where x comprises a variable, positive integer representing the number of periods removed from each respective model. The maximum number of unique models, Y, comprising x removed periods of log data of a set of N periods of log data can be described by Equation 1:

$$Y = \frac{N!}{(N-x)!(x!)}$$ Equation 1

In some embodiments, one or more periods of log data are replicated into each respective model corresponding to the number of periods removed from the respective model. For example, if a single period of log data from N periods of log data is removed for a first model, a second period of the N−1 remaining periods of log data can be replicated in the first model such that the first model comprises a number of periods equal to N.

In various embodiments, respective periods are excluded from respective models randomly. Likewise, in embodiments including replication of one or more periods for each removed period, respective replicated periods can be selected at random.

Respective periods of data can be removed from the training data set by marking the respective periods as excluded in a training set database (e.g., training set database 116 of FIG. 1 or training set database 234 of FIG. 2). In various embodiments, respective periods can be removed and/or replicated based on user input received from an interface (e.g., user interface 118 of FIG. 1 or I/O devices 212 of FIG. 2), or respective periods can be removed and/or replicated automatically according to predefined, processor executable instructions (e.g., instructions 260 of FIG. 2). Operation 320 is described in further detail hereinafter with respect to FIG. 4).

In operation 330, average anomaly scores for respective message types in respective models are calculated. Respective anomaly scores for respective message types in respective models are based on the rarity of the message type in the respective models. In some embodiments, anomaly scores for respective message types are inversely related to a number of appearances of a respective message type in a respective model. For example, a message appearing often in a respective model can have a lower anomaly score compared to a message appearing less often in the respective model. As will be appreciated by one of skill in the art, a variety of algorithms can be used to generate a score indicating a rarity of an item in a dataset. Respective average anomaly scores for each respective message type can be calculated by summing respective anomaly scores generated by the plurality of models for a respective message type and dividing by the number of models.

In operation 340, confidence intervals for respective average anomaly scores of respective message types are calculated. In some embodiments, operation 340 calculates statistics (e.g., standard deviation) of the plurality of anomaly scores generated by the plurality of models for each respective message type, determines an appropriate number of degrees of freedom, retrieves a confidence parameter (e.g., a Student's t statistic), and uses the confidence parameter, the average anomaly score, the statistics, and the plurality of models to generate a confidence interval for each respective average anomaly score for each respective message type. Operation 340 is described in further detail hereinafter with respect to FIG. 5.

In operation 350, one or more reference interval scores are calculated. Reference interval scores are calculated by combining anomaly scores of respective message types in respective intervals of the plurality of models. In some embodiments, combining anomaly scores comprises adding respective anomaly scores. In alternative embodiments, different functions or additional functions can be used alone or in combination to combine anomaly scores. In some embodiments, a reference interval score comprises an average interval score calculated by summing respective interval scores in respective models and dividing by the number of respective interval scores in respective models. In some embodiments, reference interval scores can be calculated for each respective interval (e.g., a first reference interval score for a first interval defined by the time frame 12:00 AM to 12:10 AM, a second reference interval score for a second interval defined by the time frame 12:10 AM to 12:20 AM, and so on). In alternative embodiments, a single reference interval score can be calculated (e.g., an average interval score for all intervals in all periods of all models).

In operation 360, respective confidence intervals are generated for each reference interval score calculated in operation 350. In some embodiments, operation 360 calculates statistics (e.g., standard deviation) of the plurality of interval scores used to determine a reference interval score, determines an appropriate number of degrees of freedom, retrieves a confidence parameter (e.g., a Student's t statistic), and uses the confidence parameter, the reference interval score, and the statistics to generate a confidence interval for the reference interval score.

In operation 370, the results can be output. For example, the results can be stored in a non-transitory computer readable storage medium (e.g., storage 230 or memory 225 of FIG. 2) and/or presented to a user interface (e.g., user interface 118 of FIG. 1 or I/O devices 212 of FIG. 2).

Figure 4:
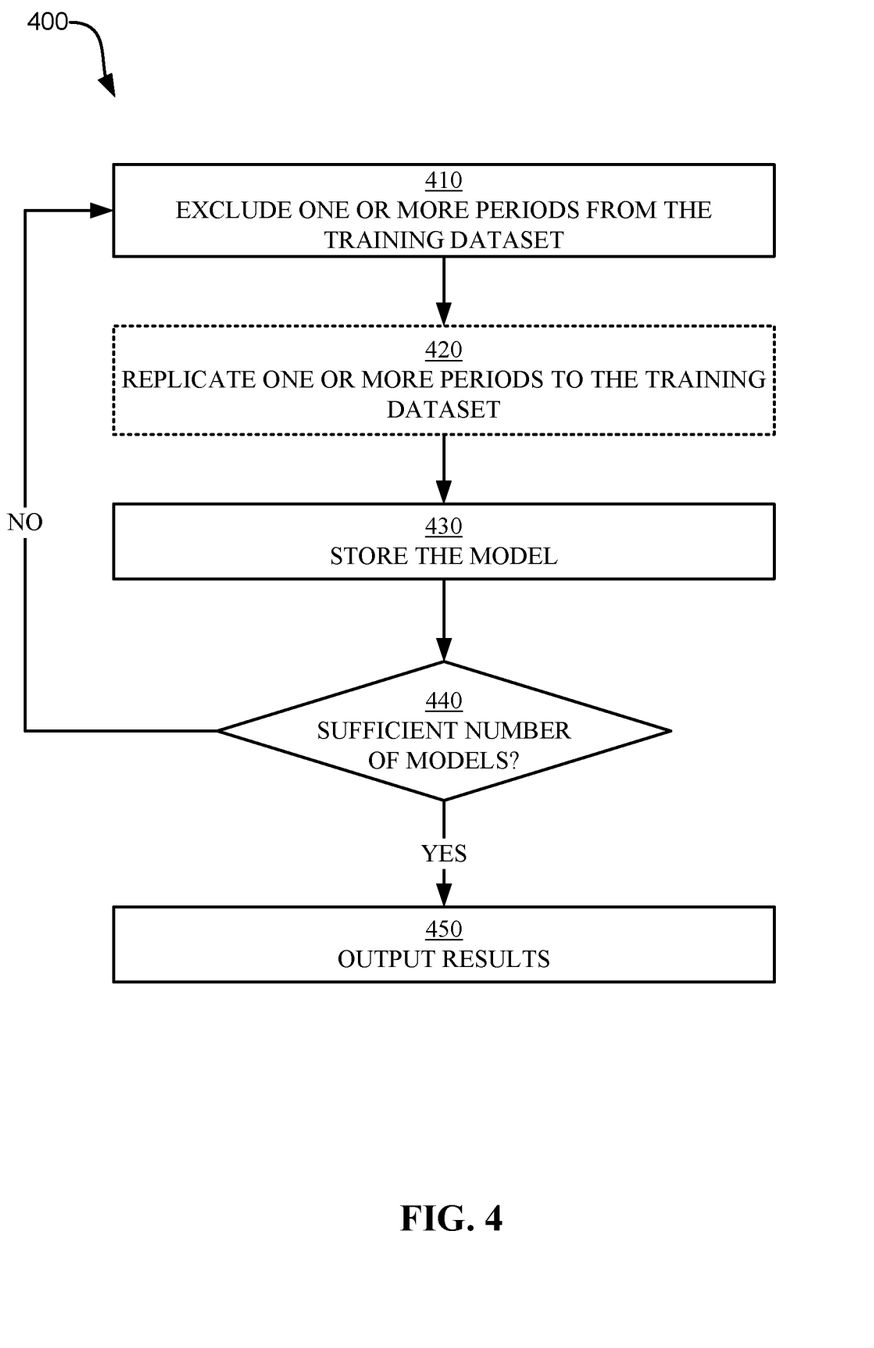
FIG. 4 illustrates a flowchart of an example method for generating a plurality of models according to some embodiments of the present disclosure.

Referring now to FIG. 4, shown is a flowchart of an example method for generating a plurality of models in accordance with some embodiments of the present disclosure. The method 400 can be a sub-method of operation 320 of FIG. 3. The method 400 can be executed by one or more processors (e.g., processor 205 of FIG. 2) according to a set of instructions (e.g., instructions 260 of FIG. 2). In some embodiments, the method 400 can be implemented by an analytics engine connected to a network (e.g., analytics engine 112 connected to network 100 of FIG. 1).

Operation 410 excludes one or more periods from the training dataset. The one or more periods can be removed based on user input (e.g., user input received from user interface 118 of FIG. 1 or I/O devices 212 of FIG. 2) or according to instructions (e.g., instructions 260 of FIG. 2). In some embodiments, a single period is removed. In alternative embodiments, more than one period is removed. The one or more periods can be removed randomly or according to a predefined sequence.

In operation of 420, one or more periods remaining in the model following operation 410 can be replicated into the model such that the model comprises a number of periods equal to the original number of periods in the training dataset. That is to say, a number of periods are replicated equal to the number of periods removed in operation 410. As indicated by the dashed lines, operation 420 is optional, and, thus, various embodiments of the present disclosure exist which replicate one or more periods of the training dataset, and various embodiments of the present disclosure exist which do not replicate one or more periods of the training dataset.

Operation 430 stores the model generated in operation 410, and, optionally, operation 420. The model can be stored in a non-transitory computer readable storage medium (e.g., memory 225 or storage 230 of FIG. 2) and/or presented to an interface (e.g., user interface 118 of FIG. 1 or I/O devices 212 of FIG. 2).

Operation 440 determines if there are a sufficient number of models. If there is an insufficient number of models, then the excluded period is returned to the sample and, in embodiments where operation 420 does occur, the replicated period is removed from the sample, and the method 400 returns to operation 410. Another one or more periods is then excluded in operation 410, and, in embodiments where operation 420 occurs, another one or more periods is replicated in operation 420. Operations 410, 420, and 430, are repeated until operation 440 has been satisfied by the sufficient number of models created.

The sufficient number of models can be defined based on user input (e.g., user input received from user interface 118 of FIG. 1 or I/O devices 212 of FIG. 2) or according to instructions (e.g., instructions 260 of FIG. 2). In some embodiments, a sufficient number of models is equal to the plurality of periods comprising the training dataset. In some embodiments, a sufficient number of models is greater than the plurality of periods comprising the training dataset. In some embodiments, a sufficient number of models is equal to a number generated by an equation such as, but not limited to, Equation 1. Operation 450 outputs the plurality of models once a sufficient number of models have been established as determined by operation 440. Operation 450 can output the models to a training set database (e.g., training set database 116 of FIG. 1 or training set database 234 of FIG. 2) and/or to a user interface (e.g., user interface 118 of FIG. 1 or I/O devices 212 of FIG. 2).

Figure 5:
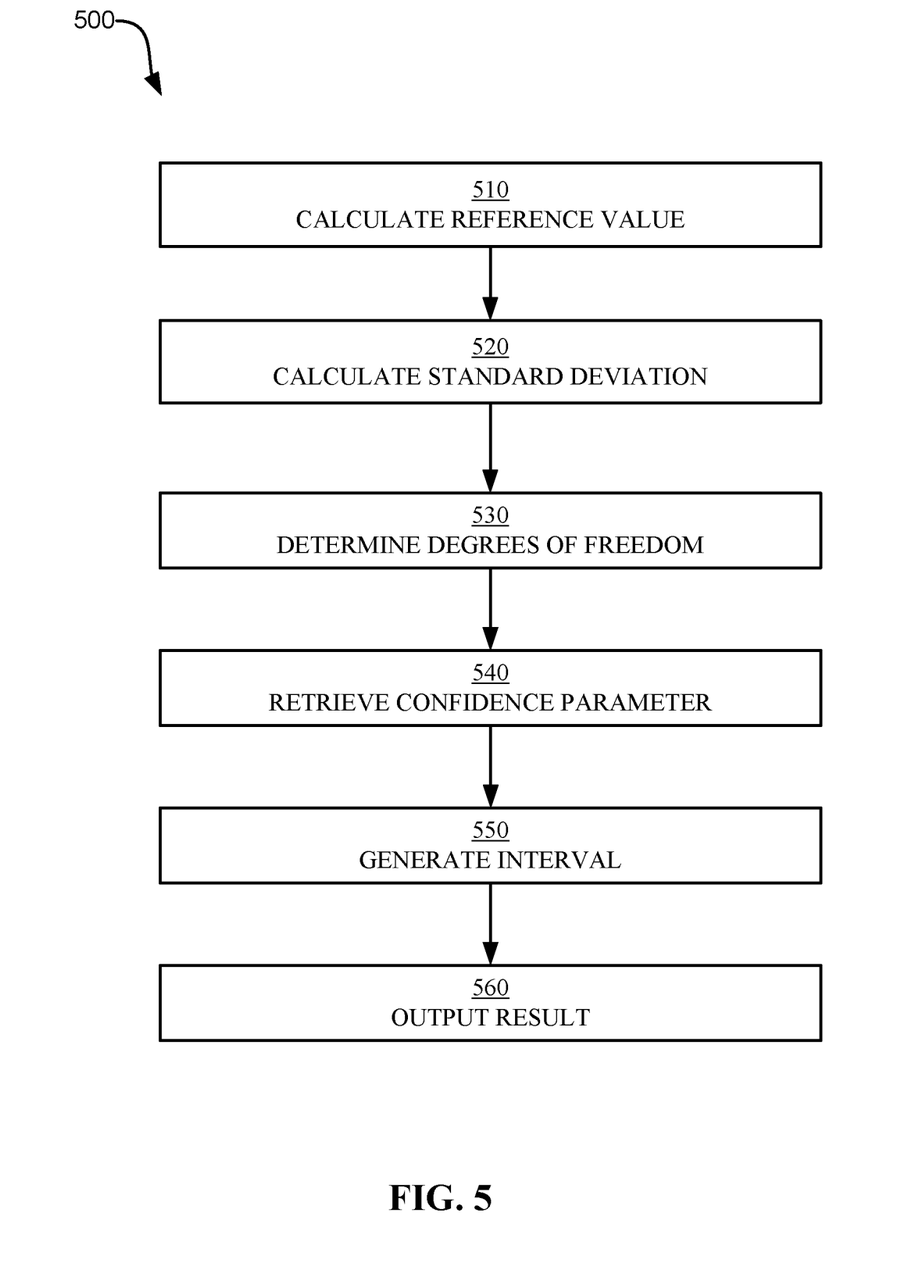
FIG. 5 illustrates a flowchart of an example method for generating a confidence interval according to some embodiments of the present disclosure.

Referring now to FIG. 5, illustrated is a flowchart of an example method for calculating a confidence interval in accordance with some embodiments of the present disclosure. The method 500 can be a sub-method of operation 340 and/or operation 360 of FIG. 3. The method 500 can be executed by one or more processors (e.g., processor 205 of FIG. 2) according to a set of instructions (e.g., instructions 260 of FIG. 2). In some embodiments, the method 500 can be implemented by an analytics engine (e.g., analytics engine 112 connected to network 100 of FIG. 1).

Operation 510 calculates respective reference values. The reference values can comprise average anomaly scores (e.g., generated in operation 330) and/or reference interval scores (e.g., generated in operation 350).

Operation 520 calculates a standard deviation for respective reference values according to the plurality of values used to generate the respective reference values. For example, operation 520 can calculate a standard deviation of respective anomaly scores generated for a first message type in each of the plurality of models. Likewise, operation 520 can calculate a standard deviation of respective interval scores used to generate the reference interval score. Operation 520 can generate additional statistics such as, but not limited to, variance.

Operation 530 determines a number of degrees of freedom. The number of degrees of freedom can be a difference between the plurality of values used to generate the reference value and a number of scorers. A scorer is a statistic used to generate anomaly scores or interval scores. For example, scorers can comprise statistics used to generate an anomaly score indicating the rarity of a message type in a model. In another example, scorers can comprise statistics used to combine anomaly scores to generate an interval score. In some embodiments, the number of degrees of freedom is equal to or less than the number of models. In some embodiments, the number of degrees of freedom is equal to or less than the plurality of values used to determine the reference value.

Operation 540 retrieves a confidence parameter. The confidence parameter can be retrieved based on the number of degrees of freedom, the desired confidence level, and an appropriate hypothesis test. The desired confidence level can be based on user input (e.g., user input received from user interface 118 of FIG. 1 or I/O devices 212 of FIG. 2) or according to instructions (e.g., instructions 260 of FIG. 2). Likewise, the appropriate hypothesis test can be based on user input (e.g., user input received from user interface 118 of FIG. 1 or I/O devices 212 of FIG. 2) or according to instructions (e.g., instructions 260 of FIG. 2). Example confidence levels include, but are not limited to, 95% or 99%. In some embodiments, confidence levels are determined according to a one-tail hypothesis test. Example distributions include, but are not limited to, the Student's t distribution and the normal distribution.

Operation 550 generates a confidence interval using the reference value retrieved in operation 510, the standard deviation calculated in operation 520, the plurality of values the standard deviation is based on, and the confidence parameter retrieved in operation 540. For example, in a case where the distribution comprises a Student's t distribution, the theoretical reference value of the population of log data can exist in a range of values centered on the reference value generated by the models as defined by equation 2:

$$\mu = \overline{X} \pm t(s/\sqrt{n})$$ Equation 2:

In equation 2, $\mu$ is equal to the theoretical reference value of the population, $\overline{X}$ is equal to the average reference value generated by the plurality of models and retrieved in operation 510, t is equal to the confidence parameter, s is equal to the standard deviation of the plurality of values used to determine the reference value and generated in operation 520, and n is equal to the plurality of values used to generate the reference value.

Operation 560 outputs the results of the method 500. Operation 560 can output a confidence interval for an average anomaly score and/or an average interval score. Operation 560 can output results to an analytics engine (e.g., analytics engine 112 of FIG. 1 or analytics engine 200 of FIG. 2), to a user interface (e.g., user interface 118 of FIG. 1 or I/O devices 212 of FIG. 2), and/or to a non-transitory computer readable storage medium (e.g., memory 225 or storage 230 of FIG. 2).

Figure 6:
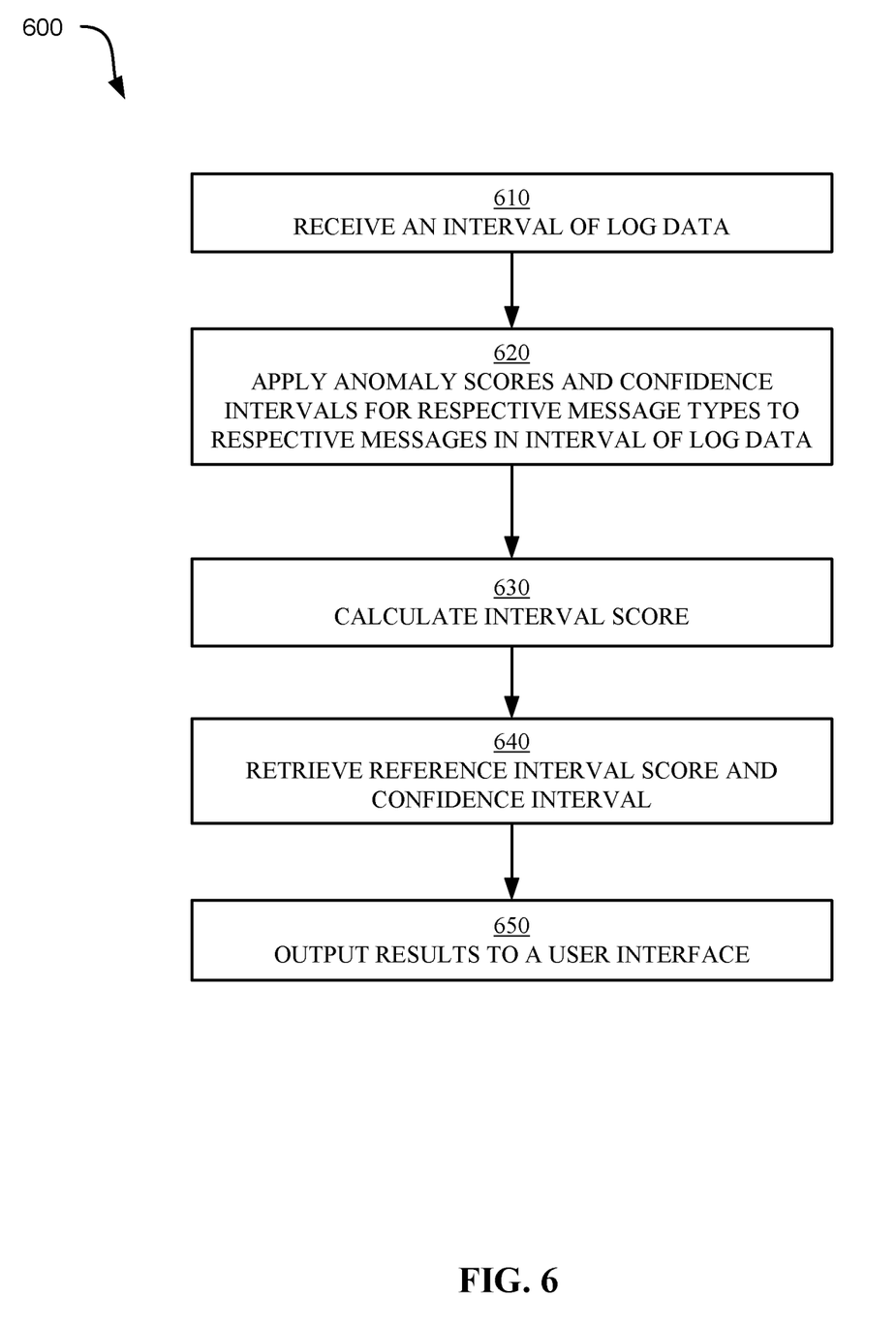
FIG. 6 illustrates a flowchart of an example method for identifying anomalies in log data according to some embodiments of the present disclosure.

Referring now to FIG. 6, shown is a flowchart illustrating an example method for analyzing log data in accordance with some embodiments of the present disclosure. The method 600 can be executed by one or more processors (e.g., processor 205 of FIG. 2) executing a set of instructions (e.g., instructions 260 of FIG. 2). In some embodiments, the method 600 can be implemented by an analytics engine functioning in a network (e.g., analytics engine 112 connected to network 100 of FIG. 1).

In operation 610, an interval of log data is received. In some embodiments, the interval of log data comprises an interval of log data such as, but not limited to, a 10 minute interval of log data generated by one or more compute nodes. In some embodiments, operation 610 receives a portion of an interval of log data (e.g., one or more log data messages generated during the interval). In various embodiments, the interval of log data is retrieved from a log data database such as log data database 114 of FIG. 1 or log data database 240 of FIG. 2. In some embodiments, the interval of log data can comprise a new interval of log data from a most recent time interval.

In operation 620, the processor applies anomaly scores and confidence intervals to respective messages in the interval of log data. Operation 620 can apply anomaly scores and confidence intervals by matching message types in the received interval of log data with stored anomaly scores and confidence intervals for respective message types stored in the training set database (e.g., anomaly scores 236 and confidence intervals 238 in training set database 234 of FIG. 2).

In operation 630, an interval score is calculated for the interval of log data. The interval score can be calculated by combining respective anomaly scores. In some embodiments, the scores can be combined by adding respective scores. In alternative embodiments, different functions and/or additional functions can be used to combine the respective anomaly scores to calculate the interval score.

In operation 640, a reference interval score and confidence interval for the reference interval score are retrieved from, for example, training set database 234 of FIG. 2. The interval score for the received interval of log data can be compared to the reference interval score and confidence interval for the reference interval score. In some embodiments, the reference interval score comprises a reference interval score for a respective time period corresponding to the received interval of log data. For example, the received interval of log data can comprise log data generated between 1:30 PM and 1:40 PM. In such an example, the reference interval score associated with the interval 1:30 PM to 1:40 PM and confidence interval for the reference interval score can be retrieved. In alternative embodiments, a reference interval score and confidence interval for the reference interval score are retrieved regardless of the respective interval corresponding to the received interval of log data.

In operation 670, results generated by the method 600 are displayed on a user interface (e.g., user interface 118 of FIG. 1 or I/O devices 212 of FIG. 2). In some embodiments, the data is stored in a computer readable storage medium (e.g., memory 225 or storage 230 of FIG. 2).

Regarding the flowcharts used to illustrate aspects of the present disclosure in FIGS. 3-6, respective blocks can be implemented by a processor according to a set of instructions or by a processor in response to receiving user input. Various embodiments of the present disclosure exist which use all, some, or none of the operations illustrated in the various flowcharts. Furthermore, embodiments of the present disclosure exist which execute one or more blocks of one or more flowcharts in an order other than the order shown and described in FIGS. 3-6.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing, invoicing, or otherwise receiving payment for use of the systems.

What is claimed is:

1. A method comprising:
receiving, at a training set database of a compute node, a plurality of periods of log data comprising various message types, wherein the plurality of periods of log data is less than 90 days of log data, wherein the plurality of periods of log data are retrieved from one or more operations logs (OPERLOGS) of at least one server, wherein respective periods of log data comprise a plurality of subsets, wherein respective subsets comprise log data from a respective time interval of a respective period;

training a plurality of models using the plurality of periods of log data, wherein respective models are trained on respective training sets comprising the plurality of periods of log data having two periods of log data excluded from the respective training sets and two other periods of log data replicated into the respective training sets, and wherein a number of models is greater than a number of periods of log data;

for respective models, calculating respective anomaly scores for at least a first message type indicating a rarity of the first message type in the respective models, wherein respective anomaly scores are inversely related to a number of appearances of a respective message type in a respective model;

determining a first average anomaly score for the first message type by dividing a sum of the respective anomaly scores by the number of models;

calculating a confidence interval for the first average anomaly score of the first message type based on the first average anomaly score, a standard deviation based on respective anomaly scores of the first message type, the plurality of models, and a confidence parameter comprising a Student's t statistic based on a 99% confidence level for a one-tail hypothesis test and a number of degrees of freedom equal to the number of models;

storing, for respective various message types, respective average anomaly scores and respective confidence intervals for respective average anomaly scores in a non-transitory computer readable storage medium;

detecting an anomaly in a new subset of log data based on applying the respective average anomaly scores and the respective confidence intervals to corresponding message types in the new subset of log data;

metering usage of the detecting the anomaly in the new subset of log data; and generating a bill based on the metered usage.

2. The method of claim 1, wherein the detecting the anomaly further comprises:

receiving the new subset of log data comprising a plurality of new messages;

matching respective message types of the plurality of new messages to respective message types stored in the non-transitory computer readable storage medium;

applying, for respective matched message types in the plurality of new messages, respective average anomaly scores and respective confidence intervals for the respective average anomaly scores to respective new messages of the new subset of log data; and presenting, for respective new messages in the new subset of log data, respective average anomaly scores and respective confidence intervals for respective average anomaly scores to a user interface.

3. The method of claim 1, further comprising:

combining, for respective models of the plurality of models, respective anomaly scores of respective messages in a first subset associated with a first time interval to generate a plurality of respective first subset scores;

calculating an average first subset reference score by dividing a sum of respective first subset scores by the number of first subset scores;

calculating a first reference confidence interval for the average first subset reference score based on the average first subset reference score, a statistic based on respective first subset scores, the number of first subset scores, and a confidence parameter; and storing the average first subset reference score and the first reference confidence interval for the average first subset reference score in the non-transitory computer readable storage medium.

4. The method of claim 3, wherein the detecting the anomaly further comprises:

receiving the new subset of log data comprising a plurality of new messages from the first time interval;

matching respective message types of the plurality of new messages to respective message types stored in the non-transitory computer readable storage medium;

applying, for respective matched message types in the plurality of new messages, the respective average anomaly score and the respective confidence interval for the respective average anomaly score from the non-transitory computer readable storage medium;

summing respective average anomaly scores for the respective matched message types of the plurality of new messages to generate a new subset score for the new subset of log data;

presenting the new subset score, the first average subset reference score for the first time interval, and the first reference confidence interval associated with the first average subset reference score for the first time interval to a user interface.

5. A system comprising:

one or more processors; and one or more computer-readable storage media storing program instructions which, when executed by the one or more processors, are configured to cause the one or more processors to perform a method comprising:

receiving, at a training set database of a compute node, a plurality of periods of log data comprising various message types, wherein the plurality of periods of log data is less than 90 days of log data, wherein the plurality of periods of log data are retrieved from one or more operations logs (OPERLOGS) of at least one server, wherein respective periods of log data comprise a plurality of subsets, wherein respective subsets comprise log data from a respective time interval of a respective period;

training a plurality of models using the plurality of periods of log data, wherein respective models are trained on respective training sets comprising the plurality of periods of log data having two periods of log data excluded from the respective training sets and two other periods of log data replicated into the respective training sets, and wherein a number of models is greater than a number of periods of log data;

for respective models, calculating respective anomaly scores for at least a first message type indicating a rarity of the first message type in the respective models, wherein respective anomaly scores are inversely related to a number of appearances of a respective message type in a respective model;

determining a first average anomaly score for the first message type by dividing a sum of the respective anomaly scores by the number of models;

calculating a confidence interval for the first average anomaly score of the first message type based on the first average anomaly score, a standard deviation based on respective anomaly scores of the first message type, the plurality of models, and a confidence parameter comprising a Student's t statistic based on a 99% confidence level for a one-tail hypothesis test and a number of degrees of freedom equal to the number of models;

storing, for respective various message types, respective average anomaly scores and respective confidence intervals for respective average anomaly scores in a non-transitory computer readable storage medium;

detecting an anomaly in a new subset of log data based on applying the respective average anomaly scores and the respective confidence intervals to corresponding message types in the new subset of log data;

metering usage of the detecting the anomaly in the new subset of log data; and generating a bill based on the metered usage.

6. The system of claim 5, wherein the detecting the anomaly further comprises:

receiving the new subset of log data comprising a plurality of new messages;

matching respective message types of the plurality of new messages to respective message types stored in the non-transitory computer readable storage medium;

applying, for respective matched message types in the plurality of new messages, respective average anomaly scores and respective confidence intervals for the respective average anomaly scores to respective new messages of the new subset of log data; and presenting, for respective new messages in the new subset of log data, respective average anomaly scores and respective confidence intervals for respective average anomaly scores to a user interface.

7. The system of claim 5, further comprising:

combining, for respective models of the plurality of models, respective anomaly scores of respective messages in a first subset associated with a first time interval to generate a plurality of respective first subset scores;

calculating an average first subset reference score by dividing a sum of respective first subset scores by the number of first subset scores;

calculating a first reference confidence interval for the average first subset reference score based on the average first subset reference score, a statistic based on respective first subset scores, the number of first subset scores, and a confidence parameter; and storing the average first subset reference score and the first reference confidence interval for the average first subset reference score in the non-transitory computer readable storage medium.

8. The system of claim 7, wherein the detecting the anomaly further comprises:

receiving the new subset of log data comprising a plurality of new messages from the first time interval;

matching respective message types of the plurality of new messages to respective message types stored in the non-transitory computer readable storage medium;

applying, for respective matched message types in the plurality of new messages, the respective average anomaly score and the respective confidence interval for the respective average anomaly score from the non-transitory computer readable storage medium;

summing respective average anomaly scores for the respective matched message types of the plurality of new messages to generate a new subset score for the new subset of log data;

presenting the new subset score, the first average subset reference score for the first time interval, and the first reference confidence interval associated with the first average subset reference score for the first time interval to a user interface.

9. A computer program product comprising one or more computer readable storage media, and program instructions collectively stored on the one or more computer readable storage media, wherein the one or more computer readable storage media are not transitory signals per se, the program instructions comprising instructions configured to cause one or more processors to perform a method comprising:

receiving, at a training set database of a compute node, a plurality of periods of log data comprising various message types, wherein the plurality of periods of log data is less than 90 days of log data, wherein the plurality of periods of log data are retrieved from one or more operations logs (OPERLOGS) of at least one server, wherein respective periods of log data comprise a plurality of subsets, wherein respective subsets comprise log data from a respective time interval of a respective period;

training a plurality of models using the plurality of periods of log data, wherein respective models are trained on respective training sets comprising the plurality of periods of log data having two periods of log data excluded from the respective training sets and two other periods of log data replicated into the respective training sets, and wherein a number of models is greater than a number of periods of log data;

for respective models, calculating respective anomaly scores for at least a first message type indicating a rarity of the first message type in the respective models, wherein respective anomaly scores are inversely related to a number of appearances of a respective message type in a respective model;

determining a first average anomaly score for the first message type by dividing a sum of the respective anomaly scores by the number of models;

calculating a confidence interval for the first average anomaly score of the first message type based on the first average anomaly score, a standard deviation based on respective anomaly scores of the first message type, the plurality of models, and a confidence parameter comprising a Student's t statistic based on a 99% confidence level for a one-tail hypothesis test and a number of degrees of freedom equal to the number of models;

storing, for respective various message types, respective average anomaly scores and respective confidence intervals for respective average anomaly scores in a non-transitory computer readable storage medium;

detecting an anomaly in a new subset of log data based on applying the respective average anomaly scores and the respective confidence intervals to corresponding message types in the new subset of log data;

metering usage of the detecting the anomaly in the new subset of log data; and generating a bill based on the metered usage.

10. The computer program product of claim 9, wherein the detecting the anomaly further comprises:

receiving the new subset of log data comprising a plurality of new messages;

matching respective message types of the plurality of new messages to respective message types stored in the non-transitory computer readable storage medium;

applying, for respective matched message types in the plurality of new messages, respective average anomaly scores and respective confidence intervals for the respective average anomaly scores to respective new messages of the new subset of log data; and presenting, for respective new messages in the new subset of log data, respective average anomaly scores and respective confidence intervals for respective average anomaly scores to a user interface.

11. The computer program product of claim 9, further comprising:

combining, for respective models of the plurality of models, respective anomaly scores of respective messages in a first subset associated with a first time interval to generate a plurality of respective first subset scores;

calculating an average first subset reference score by dividing a sum of respective first subset scores by the number of first subset scores;

calculating a first reference confidence interval for the average first subset reference score based on the average first subset reference score, a statistic based on respective first subset scores, the number of first subset scores, and a confidence parameter; and storing the average first subset reference score and the first reference confidence interval for the average first subset reference score in the non-transitory computer readable storage medium.

12. The computer program product of claim 11, wherein the detecting the anomaly further comprises:

receiving the new subset of log data comprising a plurality of new messages from the first time interval;

matching respective message types of the plurality of new messages to respective message types stored in the non-transitory computer readable storage medium;

applying, for respective matched message types in the plurality of new messages, the respective average anomaly score and the respective confidence interval for the respective average anomaly score from the non-transitory computer readable storage medium;

summing respective average anomaly scores for the respective matched message types of the plurality of new messages to generate a new subset score for the new subset of log data;

presenting the new subset score, the first average subset reference score for the first time interval, and the first reference confidence interval associated with the first average subset reference score for the first time interval to a user interface.

* * * * *